May 29, 1934.  E. C. STEWART  1,961,015
METHOD OF AND APPARATUS FOR FEEDING GLASS
Filed Jan. 24, 1933
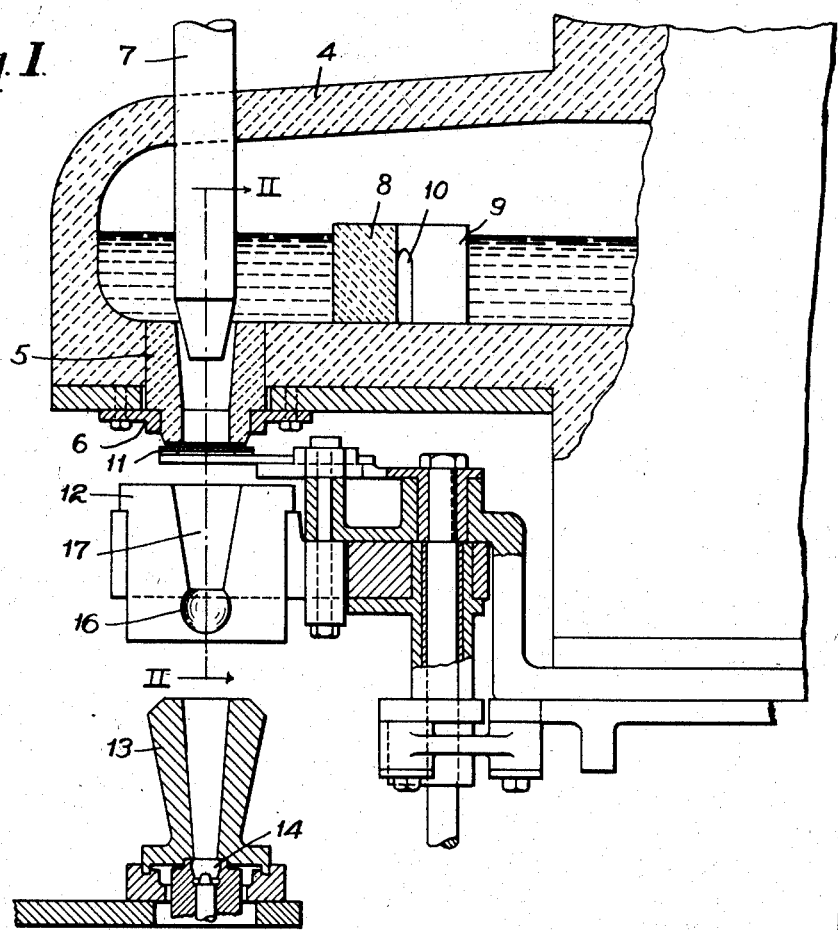
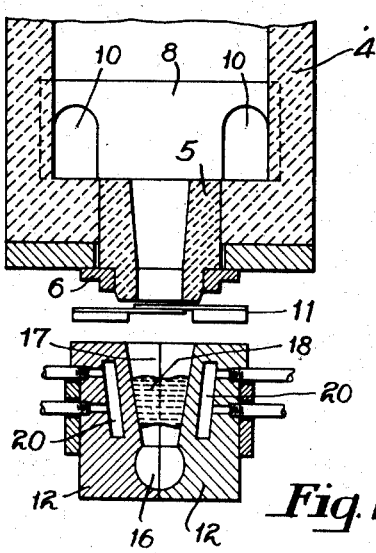
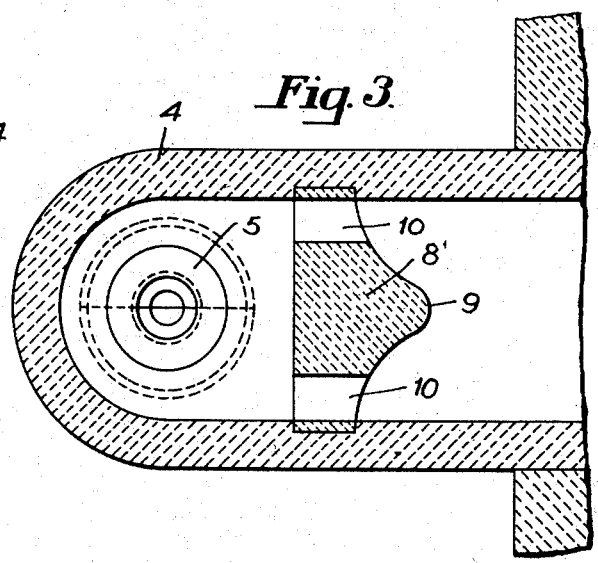
INVENTOR
Edward C. Stewart,
By Archworth Martin,
Attorney.

Patented May 29, 1934

1,961,015

UNITED STATES PATENT OFFICE 1,961,015

METHOD OF AND APPARATUS FOR FEEDING GLASS

Edward C. Stewart, Washington, Pa.

Application January 24, 1933, Serial No. 653,268

8 Claims. (Cl. 49—55)

My invention relates to the feeding of molten glass and the forming of the same into mold charges which are dropped into molds and there shaped in various ways to form the desired articles.

My invention includes a feeder of that class designated in the art as "cup feeders". In other words, the invention includes a cup-like device wherein the mold charges severed from the stream of molten glass are temporarily suspended in order to produce a preliminary shaping thereof, or at least to effect a thickening of the charge of glass so that it will not enter the mold in such elongated shape that laps or seams will be produced in the glass.

In the prior art will be found cup feeders wherein the charges of glass are first dropped into a cup having a closed bottom, and then transferred to a mold by opening the cup or by inverting the cup. In other devices, the charges of glass are dropped into a split cup of funnel-like form and with an opening in its bottom, the cup then being opened to permit the charge to fall into the mold.

In the first-mentioned instance, the cup bottom may at times unduly chill the lowermost surface of the charge, so that difficulty is experienced in properly expanding that portion of the charge. In the case of cups which have openings in their bottoms, the lower portion of the glass charge sags down and elongates, so that there is danger of such end being lapped or folded when the charge enters the mold.

My invention has for one of its objects the provision of a means and a method whereby the objectionable chilling of the lowermost portion of the cup, as above-explained, is prevented, and whereby, at the same time, the charge is prevented from sagging or elongating within what is in effect an open-bottom cup.

Another object of my invention is to provide means for so controlling the flow of molten glass to the discharge orifice of a furnace boot or forehearth that excessive accumulation of chilled glass along the sides of the boot is prevented and tendency for the flowing stream of glass to pick up chilled or stiffened particles of glass, through such accumulation, is avoided.

One form which my invention may take is shown in the accompanying drawing wherein Figure 1 is a longitudinal sectional view through the boot or discharge end of a glass furnace, together with certain of the feeding apparatus; Fig. 2 is a view taken on the line II—II of Fig. 1, and Fig. 3 is a sectional plan view of the furnace boot.

The boot or forehearth of a glass furnace is indicated by the numeral 4, and this boot is provided with an orifice which in the present case is represented by a flow ring 5, that is detachably held in place by a supporting ring or plate 6, in any well-known manner. Flow through the flow ring is controlled by a vertically-movable plug 7 which functions as a valve.

A bridge wall 8 is mounted in the boot, the mid portion of the bridge extending above the normal level of the glass, as shown more clearly in Fig. 1. The rear side of the bridge is of nose-like form as indicated at 9, to facilitate the deflection of glass flow which passes the bridge wall in the form of two streams. These streams of molten glass flow through channels or grooves 10, one of which is formed at each end of the plug or bridge wall 8.

In the absence of the bridge or deflecting member 8, the glass stream would be confined largely to the longitudinal center line of the boot, with the result that there would be accumulations of chilled glass along the side walls of the boot, to considerable thicknesses. The flowing stream would pull off portions of this chilled glass and carry them through the flow ring 5, with the result that the glass charge, and consequently the finished article, would contain imperfections.

By providing the conduits 10 so that the flow of hot glass will be in closer proximity to the side walls of the boot, there cannot be so great a building up or accumulation of chilled glass at such side walls. While glass may accumulate to some extent along the side walls, thick deposits will not be formed. With the central flowing streams of the prior art, the deposits build up to a great thickness, and while those portions of the deposits which are in closest proximity to the side walls are devitrified to an extent that they are not likely to be pulled away, and carried through the discharge orifice, those portions of the deposit which are nearer to the flowing stream are softer and less viscous, and small masses or particles are pulled therefrom by the drag of the flowing stream.

Beneath the flow ring, I mount shears 11, preferably close to the lowermost end of the ring, so that the stream of glass will be sheared at a thick portion instead of at a point of attenuation thereof, because the chilled sheared mark at a thick portion will more readily be softened and incorporated in the glass charge, than would be a chilled attenuated portion of the charge. Furthermore, the danger of an attenuated portion lapping onto the main body of the glass charge is avoided.

Beneath the shear 11, I mount a cup 12 which is formed in half sections that are periodically closed and opened to receive discharged charges of glass. The shears and the cup sections may be operated in any suitable manner, as for instance, in the manner described in my copending application, Serial No. 630,344, filed August 25, 1932.

When the cup 12 is opened, the glass charge falls into a mold 13 that may be of any suitable form, but is here shown as a bottle mold in inverted position. It will be understood, of course, that any other type of mold could be employed. In forming the bottles and other articles, it is, of course, desirable that no one portion of the mold charge be unduly chilled. For example, in the forming of a bottle having a beaded top as indicated at 14, against which a cap must have snug fit in order to effect a tight seal, it is important that the glass be of such even temperature that the top of the aricle will be very accurately shaped, and this condition is not possible if the bottom of the charge is unduly chilled when it enters the mold. Also, of course, the charge must not be too greatly elongated, or the glass will lap or fold upon itself in the mold.

In order to prevent the chilling of the bottom of the mold charge, and also to prevent attenuation thereof in the cup 12, I form a recess in the bottom of each mold section, such recesses together constituting a pocket 16 which is in effect an enlargement of the tapering cavity 17 into which the severed charges are actually received. The lower portion of the cavity 17 is restricted so that the glass charge as indicated at 18 will not actually enter the pocket 16.

As shown more clearly in Fig. 2, there is, of course, a body of entrapped air beneath the mold charge 18. While the glass tends to move toward the lower end of the cup, the expansion of the entrapped air through the heating thereof by the mold charge 18 produces pressure within the pocket 16 and beneath the charge 18, so that the bottom of the charge is supported. Small quantities of the expanded air may escape between the abutting surfaces of the mold sections, but the glass is permitted to remain in the cup only for a small fraction of a second, so that but very temporary support is required for the bottom of the charge. This small escape of air is probably desirable under most conditions, in order that there will not be such excessive expansion within the pocket 16 that the glass is actually forced upwardly within the cup. Also, it will be understood that the movement of the glass charge downwardly in the cup has the effect of compressing the entrapped air somewhat.

The glass contacting surfaces of the cup may be plated or coated with material to which the molten glass will not readily adhere, for example, chromium or nickel. Also, the cup sections, as shown more clearly in Fig. 2, are chambered at 20, for the reception of cooling liquid or air which may be circulated therethrough by means of suitable supply and exhaust pipes.

The presence of entrapped air beneath the mold charge 18, which air, of course, becomes highly heated, has the further function of causing the shear mark at the lower end of the mold charge to be eliminated, through reheating, this reheating being facilitated through the upward pressure exerted upon the mold charge, thereby preventing sagging and further cooling of the shear mark, and tending to force the shear mark toward the thickened mass of the mold charge.

I claim as my invention:—

1. The method of feeding glass which comprises dividing a stream of molten glass into mold charges, delivering said charges to a feeding cup, pneumatically supporting the lower portion of said charge while in the cup, and thereafter discharging the same to a mold.

2. The method of feeding glass which comprises dividing a stream of molten glass into mold charges, delivering said charges to a feeding cup, supporting the bottom of the charge by confined air, and thereafter discharging the same to a mold.

3. The method of feeding glass which comprises dividing a stream of molten glass into mold charges, delivering said charges to a feeding cup, supporting the bottom of the charge by expanding a confined body of air beneath said bottom, and thereafter discharging the same to a mold.

4. The method of feeding glass which comprises directing a mold charge into a cup, expanding a gaseous substance between the bottom of the cup and the underside of the said charge, and thereafter discharging the glass into a mold.

5. The method of feeding glass which comprises directing a mold charge into a downwardly tapering cup whose lower portion is of less diameter than the said charge, expanding a gaseous substance between the bottom of the cup and the underside of the said charge, and thereafter discharging the glass into a mold.

6. The method of feeding glass which comprises directing a stream of glass from a pool of molten glass toward a downwardly-tapering cup, periodically severing mold charges from said stream and permitting them to fall into the cup, pneumatically supporting the lower portion of said charge while in the cup, and thereafter discharging the charge to a mold, the bottom surface of the mold charge being prevented from contact with solid surfaces previous to and subsequent to the severing operation, until it enters a mold.

7. The combination with means for dividing a stream of molten glass into mold charges, of a feeding cup positioned to receive said charges and having a widened chambered bottom communicating with the lower end of the cup cavity, and means for discharging glass from said cup, the cup being normally closed at its bottom, and being of less diameter than the charges, at a plane above its widened portion.

8. The combination with means for dividing a stream of molten glass into mold charges, of a feeding cup positioned to receive a charge, the said cup having its cavity tapering downwardly for some distance and having an enlarged pocket below and communicating with said cavity, the cup being normally closed at its bottom, and being of less diameter than the mold charges at a plane above the said pocket.

EDWARD C. STEWART.